United States Patent [19]

Kaminski

[11] E Re. 29,645

[45] Reissued May 30, 1978

[54] PRODUCT TRANSFER SYSTEM

[75] Inventor: Elton G. Kaminski, Sidney, Ohio

[73] Assignee: The Stolle Corporation, Sidney, Ohio

[21] Appl. No.: 807,193

[22] Filed: June 16, 1977

Related U.S. Patent Documents

Reissue of:

[64] Patent No.: 3,941,070
Issued: Mar. 2, 1976
Appl. No.: 566,294
Filed: Apr. 9, 1975

[51] Int. Cl.[2] ..... B21D 43/18

[52] U.S. Cl. ..... 113/7 A; 72/349; 72/405; 113/113 A; 113/120 A; 302/2 R

[58] Field of Search ..... 113/7 A, 113 A, 120 A, 113/113 R, 115, 120 H, 11 A, 14 A; 72/343, 346, 349, 329, 404, 405, 419; 203/2 R, 29, 31

[56] References Cited

U.S. PATENT DOCUMENTS

| | | | |
|---|---|---|---|
| 726,800 | 4/1903 | Langbein | 113/113 R |
| 1,987,101 | 1/1935 | Fabrice | 72/348 |
| 2,352,095 | 6/1944 | Grotnes | 113/115 |
| 3,105,720 | 10/1963 | Barker | 302/2 R |
| 3,899,087 | 8/1975 | Tamble | 113/115 |

OTHER PUBLICATIONS

"Practical Engineering" — Dec. 1, 1950, pp. 384 to 386.

*Primary Examiner*—Lanham. C.W.
*Assistant Examiner*—Gene P. Crosby
*Attorney, Agent, or Firm*—Melville, Strasser, Foster & Hoffman

[57] ABSTRACT

Apparatus for transferring articles (such as two-piece cans) between work stations, at succeeding ones of which a dimension (such as a diameter) of the articles is reduced. The articles pass along a channel, and at each station means are provided to stop the articles in position to be operated upon. After the completion of an operation which reduces the dimension of the article, the article may pass the stop means, and be transported to the next station, where other stop means are provided to position the article for the next operation. The articles are conveyed along the channel by aerodynamic or other means. Each of the stop means is shaped to fit the article which is stopped by it, and vacuum means are associated with the stop means to insure accurate positioning of the articles at each station for the operation to be performed on them at that station.

12 Claims, 5 Drawing Figures

PRODUCT TRANSFER SYSTEM

Matter enclosed in heavy brackets [ ] appears in the original patent but forms no part of this reissue specification; matter printed in italics indicates the additions made by reissue.

BRIEF SUMMARY OF THE INVENTION

Beer and beverage cans of the so-called two-piece type are currently being produced by the drawn and ironed method and are quickly replacing the conventional three-piece can which has soldered side seams. Since the emphasis now is placed on the creation of sanitary cans for use with food products, the two-piece can has less chance for leaks and is more appealing aesthetically. Furthermore, legislation is being planned, not only in this country but also in foreign countries, to eliminate the lead from the solder used in the side seam and ultimately to prohibit the use of tin as well. These prohibitions of course would be for health reasons.

Two-piece sanitary cans are now in commercial production and present systems rely on the use of a first operation cupping press, accummulators and unscramblers and a conveyor to feed the first operation cup into a multi-out redraw and trim press. The redraw and trim presses employ a transfer device called "finger bars." These finger bars are actuated by cams driven by the crank of the press and they move the cup from one station to the next and retract. They are oscillatory in nature. They are quite complicated and because of their mass the ultimate speed of the press is limited. For these reasons the presses are usually arranged as multi-out presses and operate at slow speeds in order to achieve the required production rates. If something breaks or otherwise fails in the transfer system, the tools close on the fingers resulting in damage not only to the fingers but to the tools.

Since two-piece cans are generally blanked and drawn from coil or strip stock and are subsequently redrawn one or more times in order to reduce the diameter while increasing the can height, the present invention relies upon the reduction in diameter to make possible the use of an aerodynamic transfer device.

Basically the part is first blanked from a strip and drawn downward through a draw die, thus creating a first operation cup which is relatively large in diameter and short in height. This cup is stripped from the tooling and is now disposed with its bottom on a pass line. The first operation cup is then moved to the first intermediate station by a flow of air. At the first intermediate station there are lateral stops of a size to prevent passage of the cup in its initial condition but to permit passage after it has been redrawn and its diameter reduced. Similar arrangements are provided at other intermediate stations. At the final station, the flange is trimmed and the completed can can then be discharged from the device. The stops at each of the stations are provided with vacuum openings so that the can is held firmly in position at these stations for the redrawing operation which there takes place. After the cup has been redrawn at any of the intermediate stations, a lifter is provided to lift it back up to a position where its bottom is on the aforesaid pass line so that it may be transferred to a succeeding station by air flow, or other suitable means.

DETAILED DESCRIPTION

Figure 1:
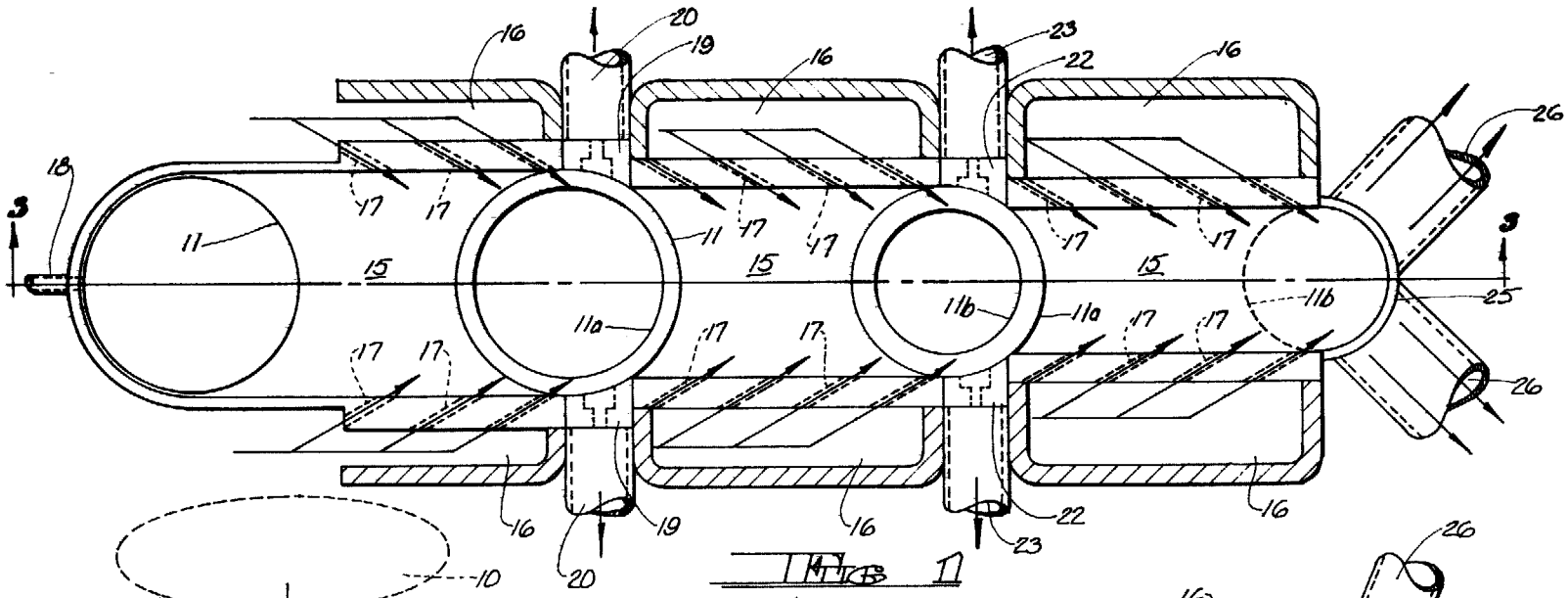
FIG. 1 is a diagrammatic horizontal cross sectional view showing the aerodynamic transfer arrangement and the several stops.

At the outset it should be remarked that details of the blanking dies and the several different drawing dies and redrawing dies and their respective plungers are not shown. These are conventional and well known and understood by those skilled in the art.

The invention is illustrated with an arrangement with four work stations. At the first station, a circular blank is punched out and this blank is drawn into a relatively wide and shallow cup. The circular blank is indicated in broken lines in FIG. 2 at 10 and the first operation cup is indicated at 11. The cup 11 after it has been drawn is stripped downwardly and ends up in a position shown in FIG. 3 with its bottom on a pass line indicated at 12. The die for forming cup 11 is indicated at 13 and the plunger at 14. The means for stripping the cup 11 have also not been shown because they are conventional. There is provided a channel 15 connecting the various stations and the channel is provided on its lateral sides with the air manifold 16. The manifold 16 communicates with the channel 15 by means of the acute angled passages 17. At the left-hand end of the channel there is an air connection 18. It will be seen that as soon as the cup 11 has been stripped and moved downward to the pass line 12, air entering at 18 moves the cup toward the right of the figures and it is then acted upon by air jets issuing through the openings 17 which continue to move it toward the right.

At 19 are provided stops and preferably these stops are curved to fit the contour of the cup 11 before it is acted upon by the redraw punch and die at the first intermediate station. Vacuum is drawn through the tubes 20 so that the cup 11 is held securely in proper position for a redraw operation.

Figure 3:
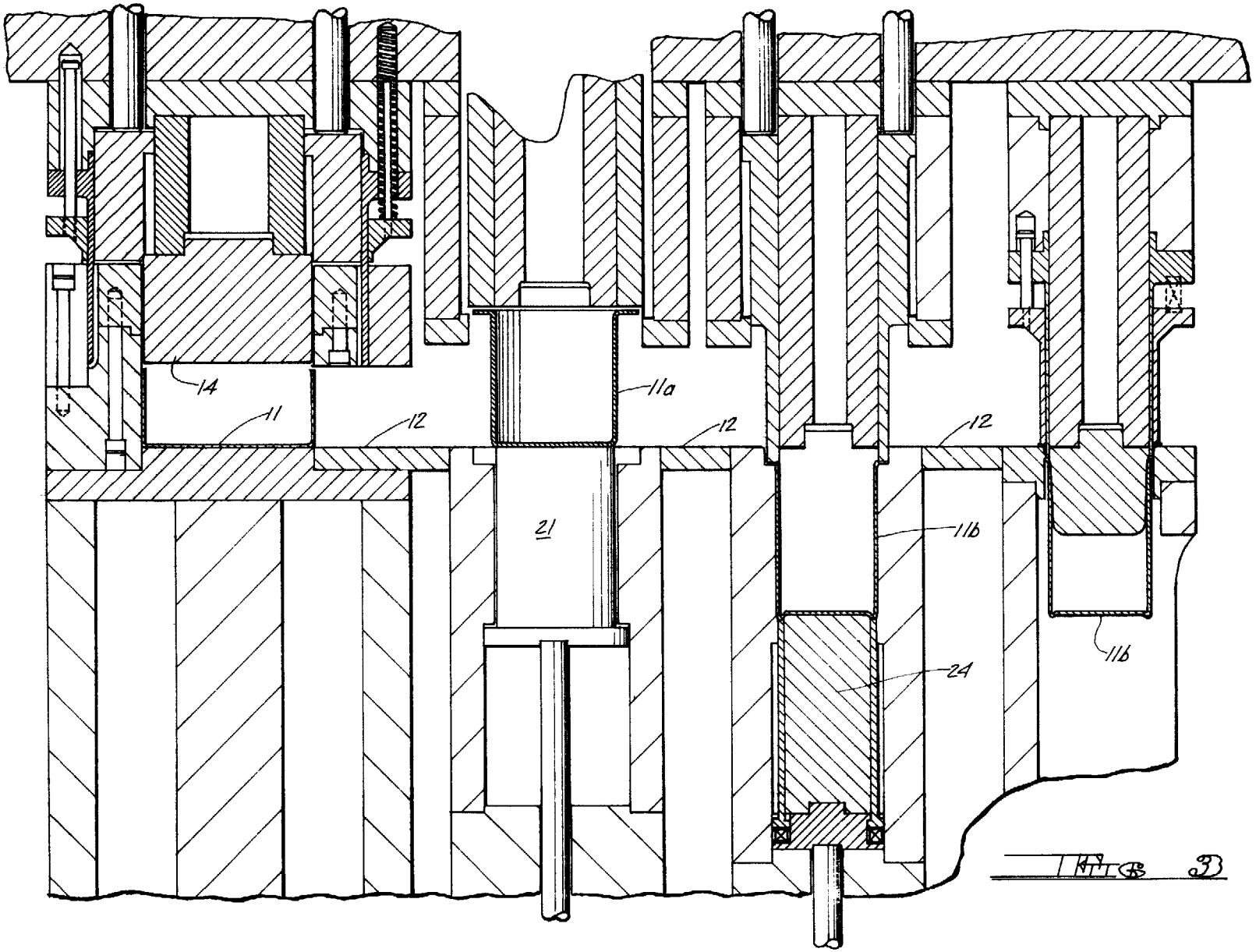
FIG. 3 is a diagrammatic cross sectional view taken on the line 3—3 of FIG. 1.

As best seen in FIG. 3, in the redraw operation the cup is drawn to an elongated and reduced diameter condition indicated at 11a and as can be seen it is now positioned below the pass line 12. However, a lifting device which may be spring actuated or air actuated is provided at 21 to lift the redrawn cup 11a back to a position where its bottom is on the pass line 12. The cup is shown in this position in broken lines in FIG. 3. The smaller diameter is shown in FIG. 1 at 11a and it will now be seen that this smaller diameter is such that the cup can pass the stops 19 and continue to the next intermediate station where it is stopped by the stops 22. The stops 22 are similar to those at 19 except that they are curved to fit the reduced circumference 11a rather than the circumference 11. Again, vacuum is drawn by means of the tube 23 to hold the redrawn cup 11a in position for the next redrawing operation. This operation is shown in FIG. 3 and the cup is now in the condition indicated at 11b. This includes a bottom forming operation and again a lifter arrangement is provided at 24 to return the cup 11b to a position where its bottom is on the pass line 12. The raised position of the cup 11b is not shown in FIG. 3 but it is of course similar to the position of the cup 11a.

Figure 2:
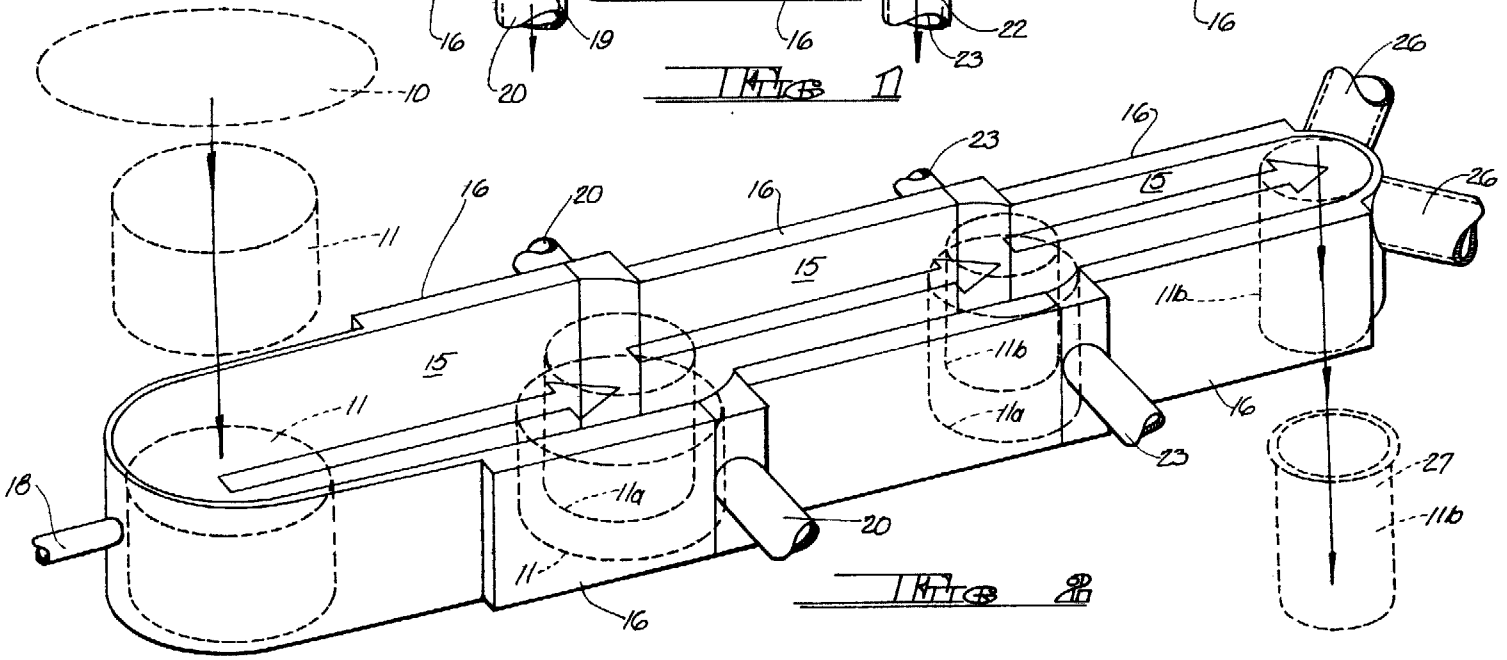
FIG. 2 is a perspective view of the same.

It will be observed that the reduced diameter 11b is such as to permit the cup now to pass on to the final station under the influence of air through the port 17. In the embodiment of FIGS. 1, 2, and 3, the cup 11b comes against a stop 25 and the cup is held in position by vacuum drawn through the tubes 26. At this station the cup is trimmed and may then be discharged downwardly by conventional means as indicated at 27.

Figures 4, 5:
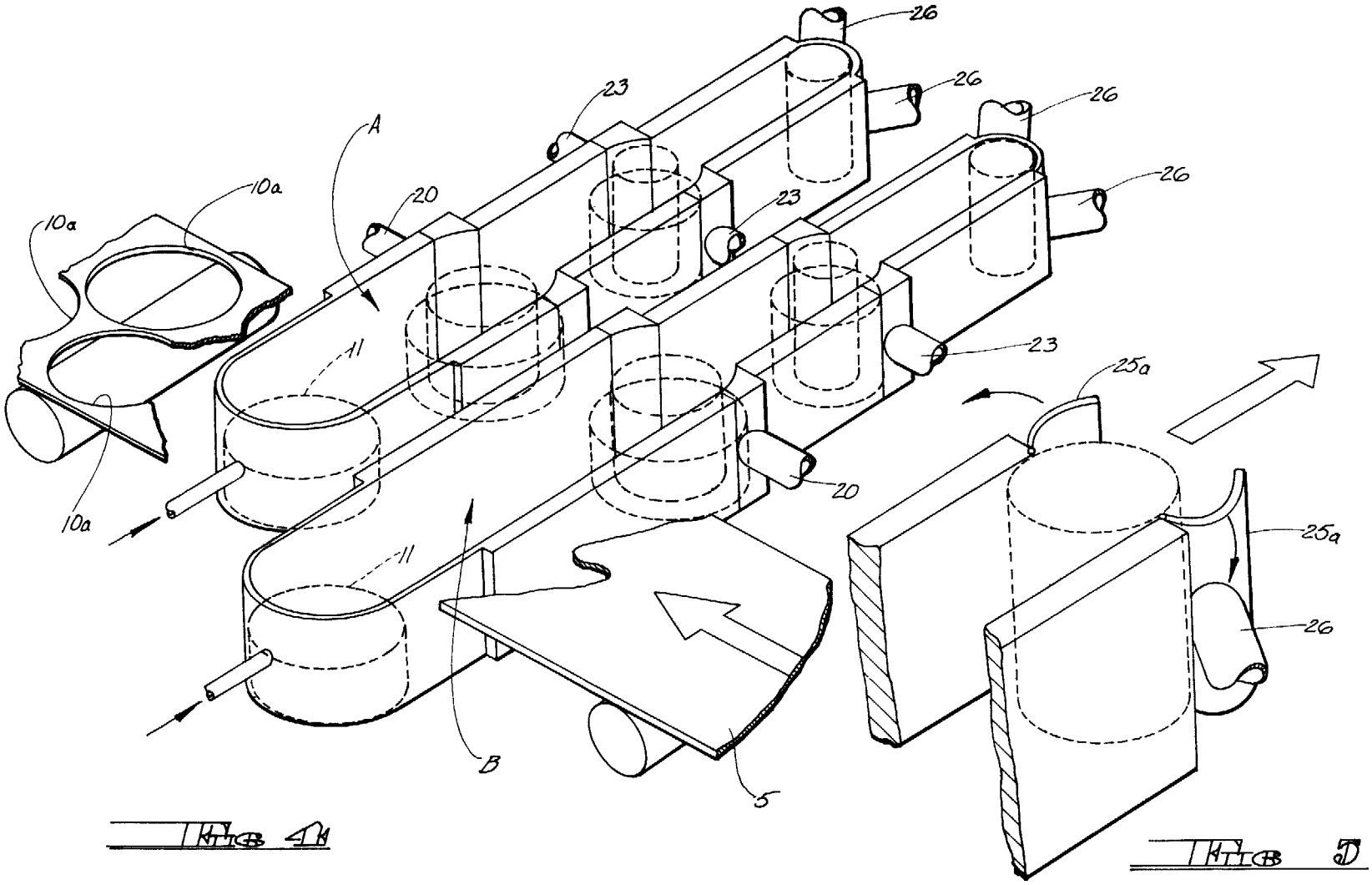
FIG. 4 is a view similar to FIG. 2 but showing a two-out arrangement.
FIG. 5 is a fragmentary perspective view showing a modification of the arrangement at the right-hand end of FIG. 2.

The discharge of the completed redrawn cup may be as shown in FIG. 5 rather than downwardly as shown in FIG. 2. Thus, the stop 25 may be in two pieces 25a, which may be hinged apart so that air through the ports 17 can blow the completed cup out in the direction of the arrow when the stops halves 25a are opened as seen in FIG. 5.

FIG. 4 shows a two-out arrangement of two structures according to FIG. 1. The two structures may be identical except that the first stations are offset from each other. The punches and dies of the two structures indicated generally at A and B operate at the same time. If the first stations were not offset there would be a considerable waste in the strip S in the blanking operation. However, if the first stations are offset as seen in FIG. 4 and the strip S is fed into the apparatus, when the two punches cut out the circular blanks 10 at the same time the holes will be positioned as seen at 10a in FIG. 4 and these are staggered so that scrap is minimized. FIG. 4 also illustrates why the first operation cup 11 is stripped downwardly. This is so that there is no interference with the passage of the strip S when it is advanced for a succeeding blanking operation.

It will be clear that numerous modifications may be made without departing from the spirit of the invention and no limitation not specifically set forth is intended and none should be implied.

The embodiments of the invention in which an exclusive property or privilege is claimed are defined as follows:

1. In an apparatus for manufacturing articles, such as two-piece can bodies, wherein a series of operations are performed on said articles at a first station, at least one intermediate station and a final station, a dimension of said article being reduced at said intermediate station; a channel connecting said stations, said channel at said intermediate station having fixed stop means of a dimension to prevent passage thereby of an article prior to the operation to be performed at such intermediate station, but to permit passage thereby after the operation at said intermediate station has been performed, and means for advancing the articles from station to station after each operation[.], *said stop means being configured to fit snugly the portion of the article bearing against it prior to the operation to be performed at said station, and vacuum means associated with said stop means to assure that the article is properly positioned and held in place for said operation.*

[2. A structure of claim 1, wherein said stop means is configured to fit snugly the portion of the article bearing against it prior to the operation to be performed at said station, and vacuum means are associated with said stop means to insure that the article is properly positioned and held in place for said operation.]

3. Apparatus according to claim 1, wherein the sides of said channel between stations embody air manifolds, and wherein a plurality of ports extend from said manifolds into said channel at acute angles to the axis of said channel to provide for aerodynamic transfer of said articles from station to station.

4. Apparatus according to claim 1, wherein a circular blank is punched from a strip of metal at said first station and drawn into a cup, the bottom of said cup after drawing being disposed on a pass line, and said cup is redrawn to lengthen it and reduce its diameter at said intermediate station, means to return said redrawn cup to a position with its bottom on said pass line, and means to trim said redrawn cup at said final station.

5. Apparatus according to claim 4, wherein means are provided to return said trimmed cup to a position with its bottom on said pass line, and means for discharging said trimmed cup axially of said channel.

6. Apparatus according to claim 4, wherein means are provided to discharge said trimmed cup axially of said cup.

7. A double apparatus according to claim 4, wherein the intermediate and final stations are respectively side by side, but the first stations are offset, whereby staggered blanks are punched from said strip and scrap is thereby minimized.

8. In an apparatus for manufacturing two-piece can bodies and the like, wherein a circular blank is cut from a strip of metal and drawn into a cup at a first station, said cup is redrawn and its diameter reduced at a second station, and is then again redrawn and its diameter is further reduced at a third station, and is trimmed at a fourth station, said first station and intermediate stations each having a cooperating plunger and die, and means for positioning the cup on a pass line after the respective operation; a channel connecting said stations and having a floor at said pass line between said stations, said channel and said intermediate stations being attenuated such that the drawn or redrawn cup is stopped at an intermediate station in the position to be operated upon but can pass through to the next station after it has been operated upon and its diameter has been reduced, and means for advancing the drawn or redrawn cup from station to station.

9. The structure of claim 8, wherein the attenuations at said intermediate stations are respectively configured to fit snugly the portions of the drawn or redrawn cup bearing against said attenuations prior to the operation to be performed at said station, and vacuum means associated with said configured attenuations to insure that said drawn or redrawn cup is properly positioned and held in place for said operation.

10. The structure of claim 8, wherein the sides of said channel between stations embody air manifolds, and wherein a plurality of ports extend from said manifolds into said channel at acute angles to the axis of said channel to provide for aerodynamic transfer of said articles from station to station.

11. The structure of claim 8, wherein the bottom of said cup after drawing at said first station being disposed on a pass line, and said cup after being redrawn at said second and third stations is returned to a position with its bottom on said pass line, and means to trim said redrawn cup at said final station.

12. Apparatus according to claim 11, wherein means are provided to return said trimmed cup to a position with its bottom on said pass line, and means for discharging said trimmed cup axially of said channel.

13. Apparatus according to claim 11, wherein means are provided to discharge said trimmed cup axially of the cup.

* * * * *